United States Patent [19]

Stencel

[11] 4,067,371

[45] Jan. 10, 1978

[54] MECHANICALLY LOCKING FASTENER

[75] Inventor: Edgar L. Stencel, Huntington Beach, Calif.

[73] Assignee: VSI Corporation, Rosemead, Calif.

[21] Appl. No.: 705,397

[22] Filed: July 15, 1976

[51] Int. Cl.$^2$ ............................................. F16B 39/32
[52] U.S. Cl. ............................ 151/41.73; 151/19 A; 151/25 R; 151/48; 151/49
[58] Field of Search ............... 151/41.73, 41.76, 9, 151/10, 11, 19 A, 25 R, 25 A, 39, 40, 33, 48, 49, 50

[56] References Cited

U.S. PATENT DOCUMENTS

| | | | |
|---|---|---|---|
| 644,159 | 2/1900 | Blanton | 151/19 A |
| 1,539,348 | 5/1925 | Botscheller | 151/19 A |
| 1,714,711 | 5/1929 | Elkin | 151/39 |
| 1,991,574 | 2/1935 | Rabezzana | 151/49 |
| 2,877,818 | 3/1959 | Johnson | 151/41.73 |
| 2,886,089 | 5/1959 | Schlage | 151/25 R |
| 3,259,161 | 7/1966 | Rosan | 151/41.73 |
| 3,390,900 | 7/1968 | McCormick et al. | 151/25 R |
| 3,454,072 | 7/1969 | Dietlein | 151/41.73 |

FOREIGN PATENT DOCUMENTS

| | | | |
|---|---|---|---|
| 657,344 | 3/1938 | Germany | 151/48 |
| 1,115,553 | 10/1961 | Germany | 151/49 |
| 647,302 | 12/1950 | United Kingdom | 151/41.73 |

Primary Examiner—Marion Parsons, Jr.
Attorney, Agent, or Firm—Christie, Parker & Hale

[57] ABSTRACT

A mechanically locking fastener has external threads for installation in the threaded bore of a workpiece. A lock ring has internal radial serrations locked in serrations of the fastener proper, and external radial teeth of a form for gripping the wall of the workpiece bore when turning moments tend to loosen the fastener and to pass over the bore wall upon rotation in the opposite direction. The lock ring has a slip plane to permit contraction of the ring to a diameter no greater than the major diameter of the fastener and expansion of the ring when the fastener undergoes moments tending to loosen it. The fastener proper may be a stud or an insert. An external chamfer of the ring bears against a cooperating internal surface of the workpiece to positively determine the axial location of the insert with respect to the workpiece.

18 Claims, 5 Drawing Figures

MECHANICALLY LOCKING FASTENER

BACKGROUND OF THE INVENTION

The present invention relates to fasteners in general, and, more in particular, to fasteners that are permanently installed in a workpiece and which typically cooperate with another fastener to hold objects to the workpiece.

Inserts installed in parent material of a workpiece provide a means for attachment of an object to the workpiece through a second fastener. Inserts are used as when the stress requirements of a connection are greater than that provided by the parent material of the workpiece. An insert can distribute the stress over an area of the workpiece larger than would be available to the second fastener acting alone.

An example of an insert is a plug-like object having male threads for receipt in female threads of the parent material of a workpiece. The insert has an internally threaded bore for receiving male threads of a cooperating fastener. Typically, studs provide an anchor for attachment of objects to parent materials of the workpiece. A stud secures to the workpiece with male threads just like an insert does, but itself provides male threads for cooperation with a female threaded nut or the like.

Obviously, separation of the fastener from parent material of the workpiece is not desired. The threads between the two prevent the fastener from being pulled out of the workpiece. It is not uncommon to also provide against the backing out of the threads of the fastener from the threads of the workpiece.

The provision which prevents the fastener from unthreading from the workpiece has taken several forms. One form has provided radial teeth which plow or broach workpiece material as the fastener is driven essentially axially into a bore in the material. Workpiece material then occupies spaces between the teeth of the fastener and interferes with the teeth to resist relative rotation. This type of arrangement is complicated when the means for attaching the fastener to the workpiece is by threads. Clearly the provision to prevent rotation of the fastener with respect to workpiece cannot come into effect until the fastener is fully threaded into the workpiece. Standoff devices have been used to keep the teeth of the locking device from broaching workpiece material until the fastener is otherwise set. A different technique to accomplish the same result is to drive a locking device into position after the fastener is otherwise set by forcing the locking device axially into a space provided for it. The locking device in the latter technique can be an expander ring to expand material of the fastener radially against the workpiece. Alternatively, the locking device itself can directly contact the workpiece.

Another technique allows the fastener to rotate with respect to a lock ring as the fastener tightens in threads of the workpiece, and the lock ring cannot rotate with respect to the workpiece. When set, the lock ring interferes directly or indirectly with the workpiece to prevent unthreading of the fastener. The interference between the workpiece and the lock ring effected during installation has produced consequential broaching, peening or swedging of the workpiece. These actions on the workpiece can remove protective coatings and subject the workpiece to corrosion. These actions can also create stress risers in the workpiece which ultimately lead to a failure, as through fatigue. Furthermore, the lock employed in this technique may always be under stress, and the structure with which it cooperates may also be under stress in a sense which could lead to failure.

SUMMARY OF THE INVENTION

The present invention provides a means for anchoring a stud or an insert to a workpiece characterized by a lock ring engaging the workpiece only when the fastener experiences rotational moments tending to loosen it from the workpiece.

The lock ring and the fastener rotate together. Radial, externally extending teeth of the lock ring wipe without biting into the wall of a bore of a workpiece when rotated during setting of the fastener. The tooth form causes biting of the teeth into the workpiece in response to rotational moments in the opposite direction. The lock ring expands during this type of rotation because a gap in its circumference permits such expansion. Thus, when the teeth bite into the workpiece, the lock ring is stressed by the bore wall and fastener and in response to this stress there is an increase in lock ring circumference and an increase in the bite of the teeth into the wall. The gap also permits contraction of the lock ring to a diametrical dimension no greater than the maximum dimension of the fastener which is to be within the workpiece. The lock ring rotationally couples to the balance of the fastener through meshing internal and external teeth of the lock ring and fastener respectively.

A particular form of the present invention contemplates an insert externally threaded for threaded receipt in a workpiece. The insert has a head in the form of a washer pad which faces outwardly from the workpiece. A circular groove at the base of the head receives the lock ring. The groove axially neighbors external threads of the insert. The external threads and pad axially capture the lock ring. The lock ring has internal serrations meshing with external serrations of the insert to rotationally couple the two together. The meshing serrations may take many forms, for example, square form, ramp-like, or gear-like. Internal threads in a bore of the insert are to receive male threads of a cooperating fastener element. A ramp-step external tooth form of the lock ring permits rotation of the ring freely with respect to a bore of a workpiece during installation of the insert but biting into the wall of the bore when rotational moments act in the opposite direction. The gap in the lock ring slants at an angle to both the radius of the lock ring and its circumference so that facing edges of the gap slip along each other during expansion or contraction of the lock ring. In repose, the ring has a diameter which produces a slight pressure on the wall of the workpiece bore and an inner mesh geometry not in direct bearing with the serrations of the groove bore so that the ring can contract freely in response to workpiece pressure. An external chamfer as a leading edge of the lock ring guides the lock ring-insert assembly into the bore of the workpiece and abuts against a cooperating surface of the workpiece, say the flank of the first internal thread of the workpiece, to positively position the insert in its set position. This positive location assures insert material at the faying surface between the workpiece and an attached structure. The positive axial indexing also prevents threading the insert through the workpiece during installation.

These and other features, aspects and advantages of the present invention will become more apparent from

DESCRIPTION OF THE PREFERRED EMBODIMENTS

Figure 1:
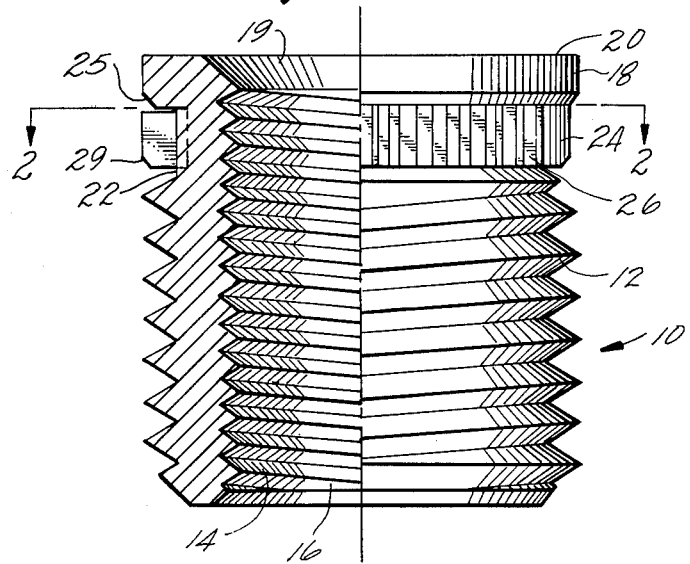
FIG. 1 is an elevational view partly in half section showing the preferred form of an insert constructed in accordance with the present invention.
Figure 2:
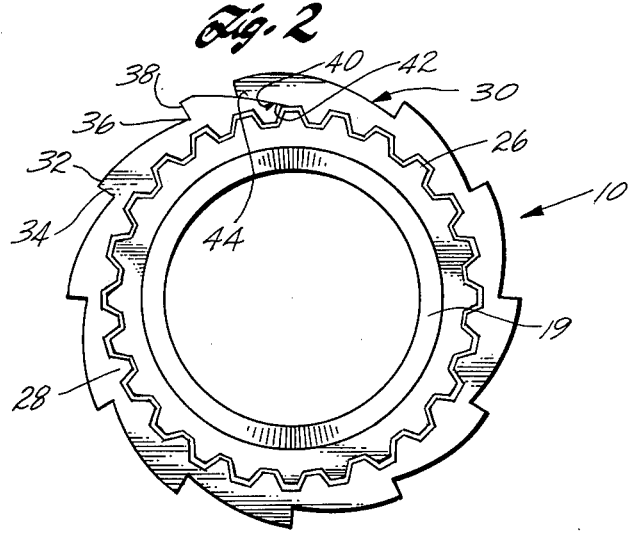
FIG. 2 views along lines 2—2 of FIG. 1 and illustrates the external tooth form of the lock ring and the serrations that rotationally couple the ring and insert together.

With reference to FIGS. 1 and 2, an insert 10 in accordance with the present invention has an externally threaded section 12 extending a major portion of the insert's length. A bore 14 of the insert is internally threaded at 16. There, internal threads extend substantially the length of the insert. A bolt pilot or chamfer 19 guides a male threaded fastener into the bore of the insert. A cylindrical head 18 caps an outside end of the insert. This head has a radial surface 20 as a faying surface for a cooperating piece of structure which is to be attached to the workpiece in which the insert is anchored by the insert and a male fastener. An example of such a structure and workpiece is a crankcase mounting flange and an engine block. A circular, external groove 22 between head 18 and threads 12 receives a lock ring 24. Head 18 has an external chamfer 25 at the corner of groove 22 to lead the lock ring into the groove. The major diameter of the lock ring does not exceed the major diameter of the balance of the insert, in this case the major diameter of the external threads and the head. Thus no special accommodation in a workpiece must be made to accommodate the diameter of the lock ring.

Groove 22 is bottomed by a plurality of axially extending serrations 26. These serrations, as seen to best effect in FIG. 2, define axially oriented grooves and splines. Lock ring 24 has internal serrated teeth 28 for meshing in the grooves between the splines of the insert. These teeth are shown to be gear-shaped in FIG. 2, with convex sides which converge toward and meet a crest, the crest being a surface on a cylinder. The teeth may take other forms, as will subsequently be developed. In any event the internal radially extending teeth of the lock ring mesh in the grooves of the insert so that the lock ring and the insert are rotationally coupled together and one cannot rotate with respect to the other. An external chamfer 29 of the lock ring pilots the latter into the bore of a workpiece and bottoms at the junction of the bore with the major diameter of the top thread in the bore. The bottoming also fixes the installed position of the insert in the workpiece. To avoid premature bottoming, the angle of the chamfer of the ring could be made, say 44°, and the angle of the chamfer of the thread could be made, say 46°. This provides a clearance which closes only where desired contact occurs.

External ramp and step-form teeth 30 of the lock ring extend radially from its axis. A ramp is shown by reference numeral 32 and a step by reference numeral 34. The ramp provides a gentle, continuous transition from a base 36 of a step 34 to a crest 38 of the step. The base is on a circle of minor diameter and the crest on a circle of a major diameter, both circles having a center on the axis of the lock ring. The slope or rise of the external teeth allows rotation of the lock ring in a counterbore of a bore of a workpiece without digging or biting into the wall of the bore or otherwise marring the wall surface. Thus, when the wall is covered with a protective coating, rotation of the lock ring clockwise as viewed from the top in FIG. 2 will not damage the protective coating and there will be no chance of protective breakdown and corrosion attack because of the passage of the lock ring into the counterbore.

The rise of the steps, however, is comparatively sudden and defines a sharp corner where the steps join the ramps. This corner or edge is capable of biting or digging into the wall of the bore in the workpiece when the lock ring experiences a rotational moment in a direction which advances the teeth into the wall. In FIG. 2 this direction would be counterclockwise when viewed from the top. The lock ring has a gap, void or split 40 all the way through it so that the ring can freely contract and expand in groove 22 of the insert. Sides 42 and 44 face each other across the gap. The relaxed outer diameter of the ring is greater than the diameter of the bore so that the ring applies a slight pressure to the bore well. The inner diameter is such as to allow the ring to respond to the slight pressure and contract without being resisted by the insert. The diameter of the base of the groove and the inner diameter of the lock ring which permit this free contraction are still close enough for rotational engagement of the serrations of the groove and lock ring so that the lock ring cannot rotate with respect to the groove. The gap also allows the lock ring to expand when the edge of its teeth bite into raw material in response to moments tending to unthread the insert from the workpiece. This expansion or contraction can readily be viewed in FIG. 2. When side 42 slips with respect to side 44, the ring expands or contracts with the sides touching. The gap slants to both the radius of the lock ring and a tangent to its circumference. This orientation produces the slippage with engagement of the sides with respect to one another during expansion and contraction of the ring. This engagement assures the concentricity of the lock ring with respect to the workpiece bore and constant uniform engagement therewith during performance of its locking function and concentricity with the insert when no locking function is necessary. When these functions are not necessary, the gag can be a space with purely radial sides.

Figure 3:
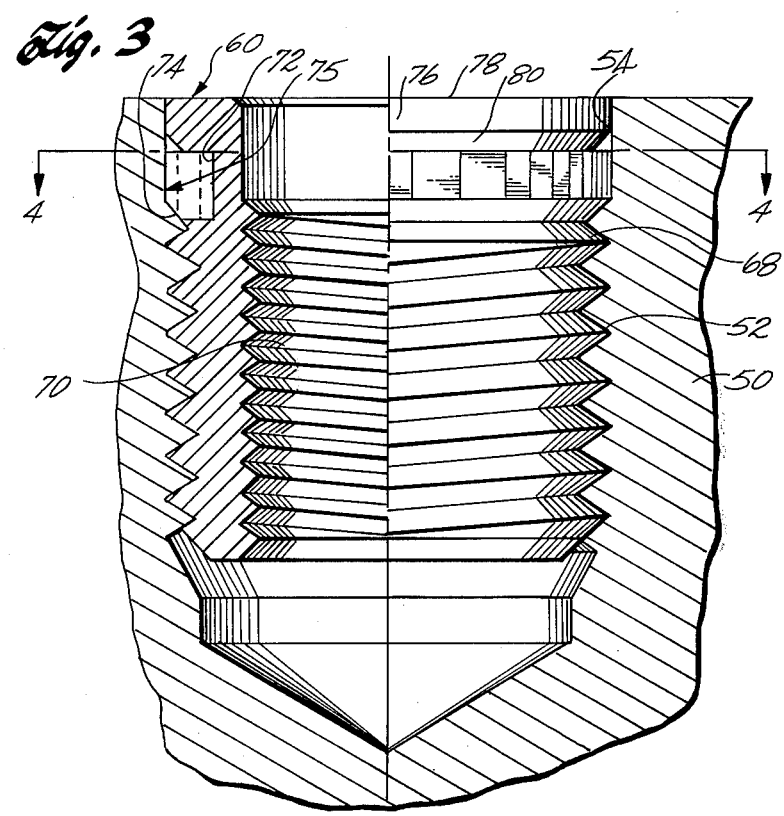
FIG. 3 shows an alternate preferred form of the insert of the present invention installed in a workpiece. This illustration is in elevation and partly in half section.

As seen in FIG. 3, the insert is used in a workpiece 50 and while the insert illustrated there differs slightly from that shown in FIGS. 1 and 2, its function in the workpiece is the same. The workpiece is internally threaded at 52 to receive the external threads of the insert. A smooth, right cylindrical counterbore 54 is coaxial with and leads into these threads. The insert is threaded into the workpiece and the lock ring occupies a portion of the counterbore.

The insert finds application where the strength of its threads must exceed the strength available in the parent material of the workpiece. The increase in engagement area between the external threads and the parent material of the workpiece accommodates the expected extra load on the internal threads of the insert.

Figure 4:
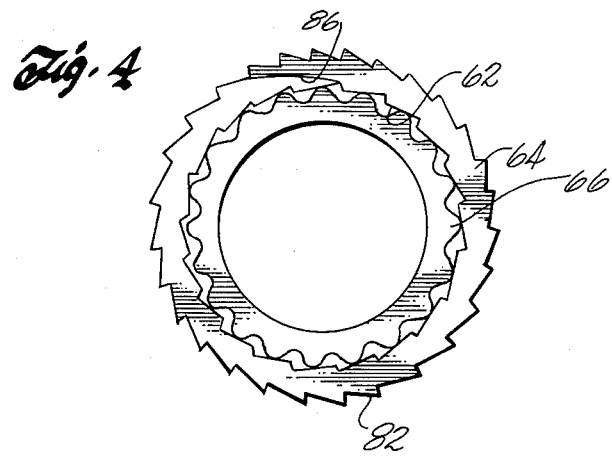
FIG. 4 views along lines 4—4 of FIG. 3 and shows an alternate form of the lock ring and insert coupling serrations, with the lock ring serrations being ramp- or wedge-like to promote lock ring expansion in response to rotational moments tending to loosen the insert.

FIGS. 3 and 4 show an insert 60 similar to insert 10 of FIGS. 1 and 2 but with internal teeth 62 of a lock ring 64 in the form of ramps or wedges. These teeth engage with axial splines or serrations 66 of the insert. Insert 60 is externally threaded at 68 and internally threaded at 70 in the manner of the insert of FIGS. 1 and 2. An annular, circular groove 72 receives lock ring 64. Again, as in the previous embodiment, the lock ring is provided with an external piloting chamfer 74 for ease of entry of the ring into bore 54 of the workpiece. As can be seen in FIG. 3, this piloting chamfer enables the workpiece to apply a radially inward force on the ring to effect its contraction and easy passage into the bore. This piloting chamfer also provides a bumper and axial locater for the insert at the base of a counterbore 75 of the parent material. Again, as in the FIGS. 1 and 2 embodiment, the insert has a head 76 having as one end a washer bearing surface 78 extending radially from the axis of the insert. Head 76 has an external chamfer 80 at the corner between it and groove 72 to facilitate the location of lock ring 64 in the groove.

Internal teeth 62 of lock ring 64 in ramp or wedge form engage splines 66 bottoming groove 72 and rotationally couple the lock ring and the balance of the insert to prevent rotation of one with respect to the other. Lock ring 64 has an external tooth form 82 similar to the form in FIG. 2, except that there are more teeth on the circumference. A gap or slit 86 separates the lock ring and permits its comparatively free expansion and contraction with relative movement taking place along a slip plane defined by the slit and with the concentricity of the ring maintained by the contact of the adjacent sides of the gap.

In the case of both FIGS. 1 and 2 and FIGS. 3 and 4, the insert is threaded into threads of a workpiece of parent material and the lock ring enters an unthreaded portion of the bore proximate its entrance. The lock ring contracts slightly because of the parent material on it. This contraction is facilitated by the lead-in chamfer of the lock ring. The elasticity of the lock ring is such, however, that only a slight pressure between its external teeth and the wall of bore 54 occurs. When the lock ring bottoms at the base of the bore, the insert is installed.

The function of the insert is to receive a male threaded fastener and to distribute the load applied by that fastener through the insert at the junction between the external threads and parent material. In the event that a torque or moment tends to rotate the insert in a direction which would tend to unthread it from the parent material, external teeth 82 will bite into the wall of the counterbore with ever increasing pressure as the unthreading torque increases. This is so because the ring is capable of comparatively free expansion because of gap 86. The lock ring being coupled to the insert by the engagement of the splines of the latter with the internal teeth of the former prevents rotation of the insert.

Figure 5:
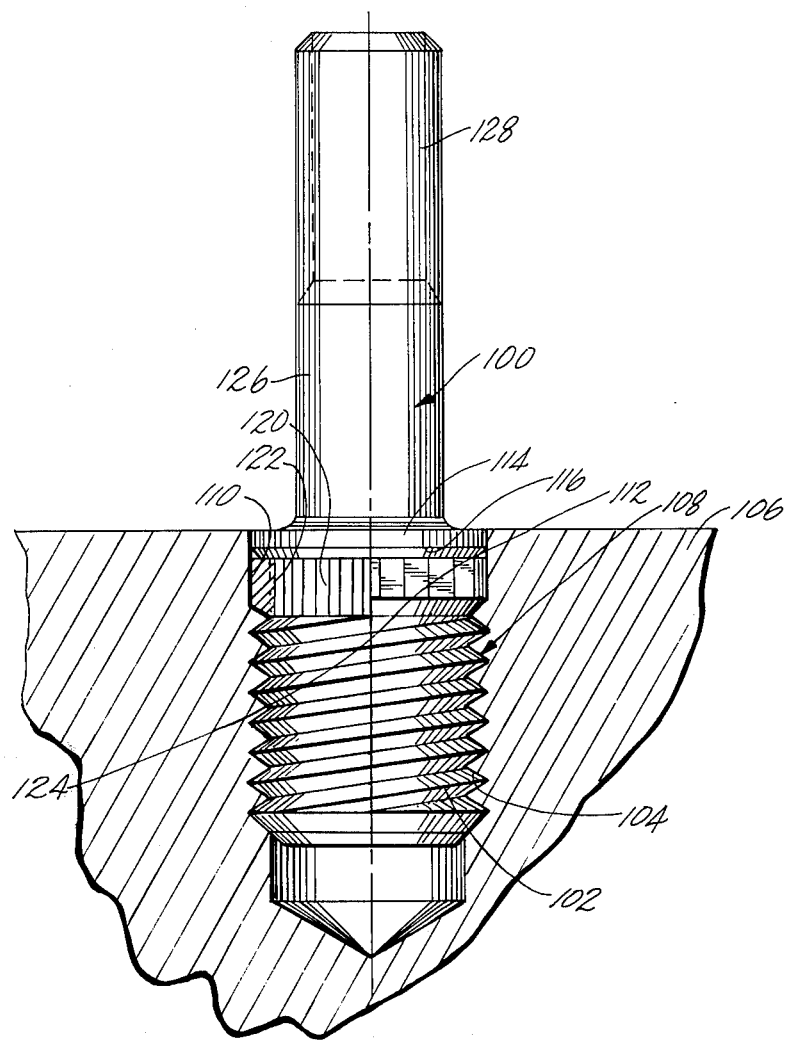
FIG. 5 illustrates a stud and lock ring installed in a workpiece, all in accordance with the present invention.

The principles of the present invention readily apply to a stud, as illustrated in FIG. 5. In this Figure, a stud 100 has external threads 102 for receipt in internal threads 104 of a workpiece of parent material 106. The workpiece is bored and threaded for this purpose at 108. As before, a counterbore 110 leads into threads 108 of the workpiece parent material to provide an axially extending wall against which a lock ring 112 can act to rotationally secure the stud to parent material. A head 114 juxtaposed to one side of a lock ring receiving groove 116 provides a bearing surface on the outside of the stud. Lock ring 112, received in groove 116 couples to the stud by engagement between axial serrations 120 at the base of the groove and internal teeth 122 on the inside axial surface of the ring, in a manner described in context with the insert species of the invention. The external axial surface of the lock ring has teeth 124 for biting into the wall of the counterbore in the parent material, again in the manner of the insert embodiment of the present invention. The stud has a shank 126 extending coaxially from head 114. Shank 126 is threaded at 128 for receipt of a nut.

Thus the present invention provides a means for anchoring an insert or a stud into parent material which comes into play only when it is necessary. Necessity arises only when the fastener experiences a torque or moment tending to unthread it from the parent material. Insertion of the insert or stud does not bring into play the biting or gripping function of the teeth of the lock ring and therefore any protective coating present on the parent material is not damaged. Accordingly, there is not likelihood that the locking device of the fastener will affect any corrosion inhibitor. Also, the locking function of the ring not coming into play until required makes the ring passive in that it does not induce any stresses in the parent material, the ring, or the fastener with which the ring cooperates. Accordingly, there is an absence of stress risers which can lead to failure, as in fatigue. No special tool is required for setting the fastener. The lock ring accommodates the installation process by contraction to a diameter acceptable in the counterbore of the parent material.

The present invention has been described with reference to a certain preferred embodiment. The spirit and scope of the appended claims should not, however, necessarily be limited to the foregoing description.

What is claimed is:

1. An improvement of the fasteners of the type which lock to a workpiece in a bore thereof by means which prevent rotation of the fastener with respect to the workpiece in a direction tending to separate the two, the improvement comprising:
   a. external threads on the fastener for receipt in internal threads of the bore of the workpiece;
   b. means on the fastener for accepting a cooperating fastener;
   c. an external groove on the fastener; and
   d. a lock ring received in the groove and having;
      i. radially extending, external teeth having a form to permit sliding rotational movement between the teeth and the wall of the bore of the workpiece in a setting rotational direction of the fastener, and biting engagement into the wall of the bore in a loosening direction of rotation of the fastener to thereby prevent separation of the fastener from the workpiece;
      ii. a slit through the ring to permit free expansion and contraction of the ring, the slit being at an angle to both the radius of the lock ring and a tangent to the circumference of the lock ring so that expansion and contraction of the ring has abutting edges of the slit in engagement to thereby maintain the concentricity of the ring; and iii. means on the inside of the ring and the groove to rotationally couple the ring to the fastener so as to prevent rotation of one with respect to the other.

2. The fastener claimed in claim 1 including a pilot chamfer on a leading edge of the lock ring to engage an edge of the bore of the workpiece and contract the lock ring, and to seat the fastener and lock ring in the bore by engagement with a radial surface of the workpiece in the bore.

3. The fastener claimed in claim 1 wherein the rotational coupling means includes meshing serrations of the groove and ring, and the inner diameter of the ring in repose slightly exceeds the outer diameter of the groove so as to permit contraction of the ring in response to engagement by the wall of the bore and the ring without interference of the fastener on the ring at the base of the groove.

4. The improvement claimed in claim 3 wherein the external tooth form of the lock ring is ramp-to-step with the steps facing the rotational direction tending to loosen the fastener from the workpiece and the meshing serrations of the groove and lock ring have surfaces permitting the wedging of the lock ring by the serrations of the groove to expand the lock ring upon rotation of the fastener in the loosening direction of rotation.

5. The fastener claimed in claim 4 wherein the fastener is an insert.

6. The fastener claimed in claim 4 wherein the fastener is a stud.

7. In a fastener of the type which includes external threads for threaded receipt in internal threads in a bore of a workpiece, rotation of the fastener in a first direction with respect to the workpiece tending to thread the fastener into the workpiece and secure the two together and rotation of the fastener with respect to the workpiece in a second and opposite direction tending to unthread the fastener from the workpiece and separate the two, a lock ring that anchors the fastener to the workpiece and prevents rotation of the fastener with respect to the workpiece in a sense tending to separate the two, and means to couple the fastener and a cooperating fastener, an improvement comprising:
   a. the lock ring having:
   i. a gap through the ring to permit elastic compression of the ring by a wall of the bore in the workpiece without damage to such wall and elastic expansion against such wall, the lock ring having an outside diameter before such elastic compression larger than the diameter of an adjacent portion of the fastener so that the ring is capable of such compression and expansion;
   ii. a plurality of regularly spaced, fixed in place, and radially extending external teeth having a ramp-to-step tooth form to permit sliding engagement by the teeth against the wall of the bore when the ramps face the first direction of rotation of the fastener with respect to the workpiece and biting engagement of the wall of the bore with the teeth when the steps face the second direction of rotation of the fastener with respect to the workpiece;

b. means for axially locating the lock ring on the fastener, the axial locating means including an external circular groove on the fastener, the lock ring being received in the groove;
c. means to secure the fastener to the lock ring for rotation together, the securing means including serrations at the base of the circular groove and across the groove, and cooperating internal serrations of the lock ring in meshing relation with the serrations at the base of the circular groove; and
d. the inside diameter of the lock ring slightly exceeding the base diameter of the circular groove to permit free contraction of the lock ring in response to the compression thereof by the wall of the bore in the workpiece.

8. The improvement claimed in claim 7 wherein the serrations of the securing means has surface means that permit the serrations at the base of the circular groove to wedge the internal serrations of the lock ring and expand the lock ring thereby when the fastener tends to rotate in the second direction.

9. The improvement claimed in claim 8 wherein the lock ring has an external chamfer as a leading edge thereof to cooperate with a surface of the workpiece and fix the axial position of the lock ring with respect to the workpiece.

10. The improvement claimed in claim 8 wherein the means to secure the fastener to the lock ring includes:
the serrations at the base of the groove on the fastener extending axially of the fastener; and
the serrations on the internal circumference of the lock ring extending axially of the fastener.

11. The improvement claimed in claim 7 wherein the gap through the ring slants at an angle to both the radius and a tangent to the circumference of the ring so that sides of the gap slide in contact as the ring expands or contracts.

12. The improvement claimed in claim 8 wherein the gap through the ring slants at an angle to both the radius and a tangent to the circumference of the ring so that sides of the gap slide in contact as the ring expands or contracts.

13. The improvement claimed in claim 12 wherein the lock ring has a piloting chamfer at a leading edge thereof to engage a corner of a workpiece adjacent the bore and contract the lock ring for acceptance in the bore and to seat the fastener against a radial surface in the workpiece bore.

14. The improvement claimed in claim 13 wherein the fastener has a washer bearing head axially adjacent the groove for retaining the lock ring and for providing washer bearing.

15. The improvement claimed in claim 14 wherein the fastener is an insert.

16. The improvement claimed in claim 14 wherein the fastener is a stud.

17. The improvement claimed in claim 14 wherein the internal serrations of the lock ring are defined by axially extending, generally gear-shaped teeth.

18. The improvement claimed in claim 14 wherein the internal serrations of the lock ring are defined by wedge form internal teeth.

* * * * *

UNITED STATES PATENT AND TRADEMARK OFFICE
CERTIFICATE OF CORRECTION

PATENT NO. : 4,067,371
DATED : January 10, 1978
INVENTOR(S) : Edgar L. Stencel

It is certified that error appears in the above-identified patent and that said Letters Patent are hereby corrected as shown below:

In the specification: Column 6, line 25, "not" should be --no--.

In the claims: Claim 1, column 6, line 52, after "having" delete the semicolon ";" and insert therefor a colon --:--.

Signed and Sealed this

Eighth Day of August 1978

[SEAL]

Attest:

RUTH C. MASON
Attesting Officer

DONALD W. BANNER
Commissioner of Patents and Trademarks